Oct. 6, 1942.     O. L. PHILLIPS     2,298,157
MASSAGING DEVICE
Filed June 24, 1941
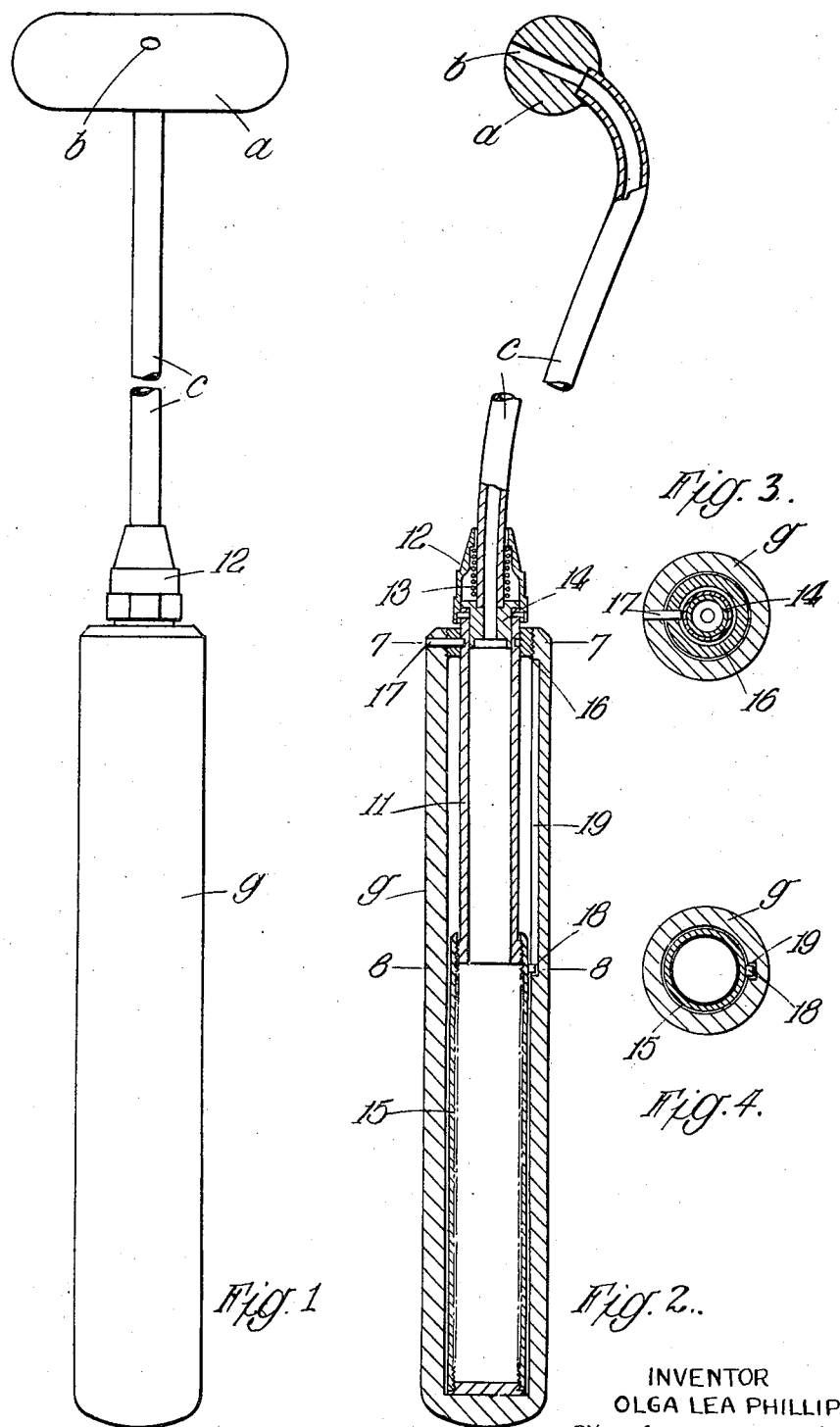
INVENTOR
OLGA LEA PHILLIPS
BY Hammond & Littell
ATTORNEYS Patented Oct. 6, 1942

2,298,157

UNITED STATES PATENT OFFICE 2,298,157

MASSAGING DEVICE

Olga Lea Phillips, London, England

Application June 24, 1941, Serial No. 399,459
In Great Britain February 4, 1941

3 Claims. (Cl. 128—62)

This invention relates to a device for massaging the human body and at the same time to apply cosmetics or the like thereto and has for its object improved means for removing wrinkles by enabling a cosmetic cream or the like to be rubbed into the pores of the skin during the massaging treatment.

For this purpose the improved device comprises a massaging head at one end of the device connected by a tube with a hollow handle at the other end thereof and means for forcing a cosmetic cream or the like from said hollow handle to said massaging head and out through an orifice in said head.

The handle may be formed in two parts one of which is movable axially of the other, e. g. by being screwed thereon, the telescoping of the one part on the other causing the cosmetic cream to be forced along the tube to the massaging head and out through the orifice in the latter.

If desired, the telescoping parts may be contained within an outer tube the length of which does not vary as the cosmetic cream is extruded from the device.

The invention is illustrated by the accompanying drawing of which

Figure 1 is a front elevation and Figure 2 is a sectional side elevation of one form of the device; whilst Figures 3 and 4 are cross-sections on the lines 3—3 and 4—4, Figure 2, respectively.

According to the form of the invention illustrated the massaging head $a$ of the device is of cylindrical form with substantially hemi-spherical ends. This head $a$ has a diametrically extending passage $b$ and has connected therewith, at one end of said passage, one end of a tube $c$ bent as a swan-neck.

The tube $c$ carrying the head $a$ is united with an open-ended tube 11 by means of a collar 12 influenced by a spring 13, the tube $c$ having at that end thereof remote from the head $a$ a plug 14 adapted to fit into the tube 11, whilst the collar 12 has a bayonet joint connection with said tube 11. At its opposite end the tube 11 is threaded externally to co-operate with an internally threaded tube 15 which is closed at one end, the arrangement being such that by screwing the tube 15 on the tube 11 a charge of cosmetic cream which has been introduced previously into said tubes is extruded through the tube $c$.

In order that the tubes 11 and 15 may be telescoped without reducing the effective length of the handle of the device said tubes are housed in a hollow handle $g$ made of synthetic resin or like material, and the hollow handle $g$ is screwed onto a collar 16 around the tube 11 and said handle $g$ secured to said collar 16 by a pin 17 which extends inwardly into a peripheral groove in the tube 11 thereby permitting relative rotation of the handle $g$ and tube 11 but without relative movement in the axial direction, whilst relative movement in the axial direction but without relative rotation between the handle $g$ and the tube 15 is obtained by a pin 18 projecting radially from the tube 15 into a longitudinal groove 19 in said hollow handle $g$, hence, rotation of the latter serves to extrude cosmetic cream through the tube $c$ and out through the passage $b$ in the head $a$.

In some cases the handle $g$ may be pushed on to the body $f$ or equivalent part, or said handle may be in the form of a collapsible tube, or may contain such a collapsible tube and be formed with a thumb hole, in order to enable the cosmetic cream or the like to be extruded through the massaging head $a$.

For use, the head $a$ of the device is preferably warmed, e. g. by dipping it in hot water, in order to reduce the viscosity of the cosmetic cream and to cause the pores of the skin to open to allow the cream to enter. As the head $a$ is moved over the skin, the hollow handle $g$ is turned relatively to the head $a$ from time to time thus causing the internally threaded tube 15 to turn relatively to the tube 11 and force cosmetic cream out of the orifice in the head $a$ on to the skin. The arrangement is such that this produces a very small movement of the tube 15 longitudinally of the device, and consequently only a minute quantity of cream is extruded.

I claim:

1. A massaging device having a massaging head connected by a tube with a hollow handle, said head being formed with a passage in communication with said tube, and means for forcing plastic material from said hollow handle through said tube and said passage; said means including two telescopic tubes constituting parts of said handle, one of which is connected detachably with the tube with which said massaging head is connected.

2. A massaging device having a massaging head connected by a tube with a hollow handle, said head being formed with a passage in communication with said tube, and means for forcing plastic material from said hollow handle through said tube and said passage, said means including two telescopic tubes encased by said handle, one of said telescopic tubes being connected detachably with the tube with which said massaging head is connected, screw threads on said two tubes connecting the same for relative telescopic movement, said one tube being rotatable relatively to said handle but restrained against movement relatively thereto in the axial direction, and said handle being movable in the axial direction relatively to the other of said telescopic tubes, but restrained against rotation relatively thereto.

3. A massaging device comprising a massaging head having a passage for plastic material therein, a feed tube connected at one end to said head in communication with said passage, and means connected to the other end of said feed tube for storing a supply of plastic material and dispensing the same through said feed tube into said head, said means comprising a hollow casing, a storage tube located within said hollow casing and connected therewith for relative axial movement but against relative turning movement, a second storage tube extending into said hollow casing and connected therewith for relative turning movement but against relative axial movement, means interconnecting the said storage tubes to telescope the same together in response to relative turning movement between said second storage tube and said casing, and means connecting said second storage tube with said other end of said feed tube.

OLGA LEA PHILLIPS.